(No Model.) 2 Sheets—Sheet 1.

W. W. GREEN.
METHOD OF MAKING SPIRAL CONVEYERS.

No. 361,998. Patented Apr. 26, 1887.

Witnesses.
W. Rossiter
Otto Luebkert

Inventor
William W. Green
By Wrabb Lotz
Atty.

(No Model.) 2 Sheets—Sheet 2.

W. W. GREEN.
METHOD OF MAKING SPIRAL CONVEYERS.

No. 361,998. Patented Apr. 26, 1887.

Witnesses.
W. Rossiter
Otto Luebkert

Inventor
W. W. Green
By Wm B Lotz
Atty

UNITED STATES PATENT OFFICE.

WILLIAM W. GREEN, OF CHICAGO, ILLINOIS, ASSIGNOR TO THE SPIRAL CONVEYER COMPANY, OF SAME PLACE.

METHOD OF MAKING SPIRAL CONVEYERS.

SPECIFICATION forming part of Letters Patent No. 361,998, dated April 26, 1887.

Application filed August 3, 1886. Serial No. 209,918. (No model.)

*To all whom it may concern:*

Be it known that I, WILLIAM W. GREEN, a citizen of the United States of America, residing at Chicago, in the county of Cook and State of Illinois, have invented certain new and useful Improvements in Methods of Forming Spiral Conveyers, of which the following is a specification, reference being had therein to the accompanying drawings.

The nature of my invention relates to spiral or screw conveyers as used in flour-mills, grain-elevators, &c., for moving grain, flour, or other material; and it has been my object to produce such a conveyer that is more simple and durable in its construction, and that will operate with less friction, and which for that purpose is provided with conveyer-flights made continuous of a single bar of straight flat or band iron.

For bending a bar edgewise to assume a true spiral shape, one edge must be contracted while its other edge is being elongated, and therefore, with winding such bar over a mandrel, it becomes necessary to provide means that will hold the bar on its proper rectangular position relative to such mandrel and to prevent its becoming wrinkled. Again, with bending such bar to form a close spiral, the mandrel upon which it is wound must be of proportional larger diameter than the shaft upon which such spiral is stretched to form the continuous conveyer-flight of proper pitch, because with stretching out the diameters of the spiral are decreased.

My invention, therefore, principally consists, first, of the manipulation in successive order of first punching the end of the bar, then giving the bar the starting bend, next winding it upon a mandrel, forming a closely-pitched spiral thereon, and finally to stretch this spiral upon its shaft of smaller diameter than the mandrel to form the flights of proper pitch thereupon; secondly, in the manner of bending spiral conveyer-flights from a straight bar of iron by winding upon a mandrel, and at the same time drawing the bar through a grooved stationary die; and, third, in the device for securing the conveyer-flight upon its shaft, all as will be hereinafter fully described and specifically claimed.

Figure 1:
Figure 2:
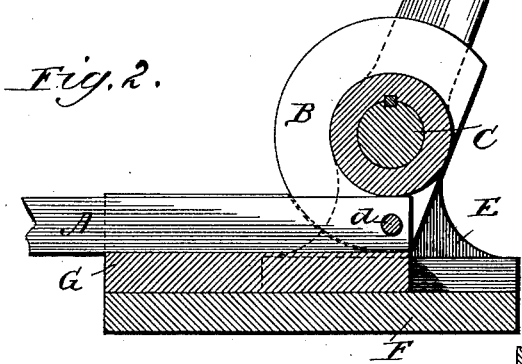
Figure 3:
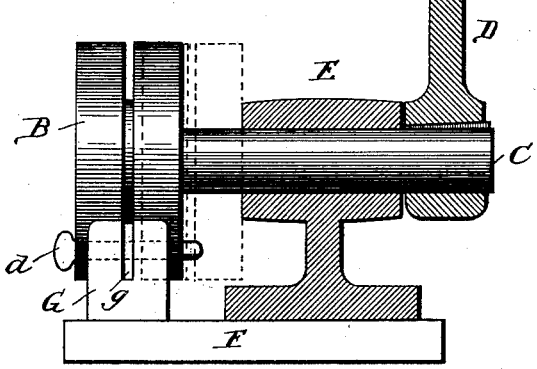
Figure 4:
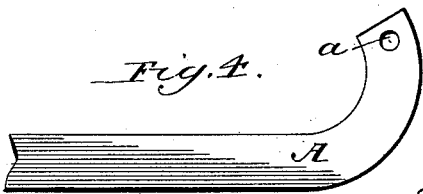
Figure 5:
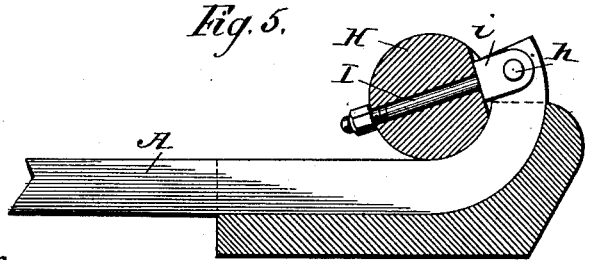
Figure 6:
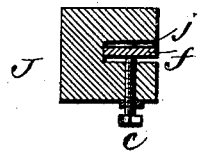
Figure 7:
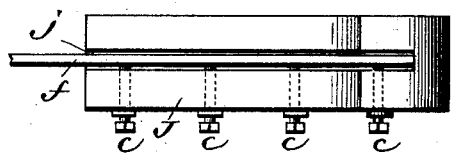
Figure 8:
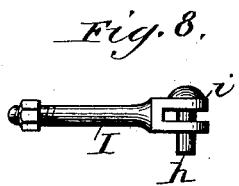
Figure 9:
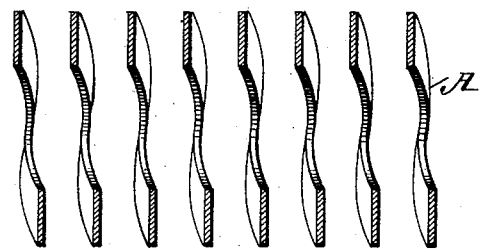
Figure 10:
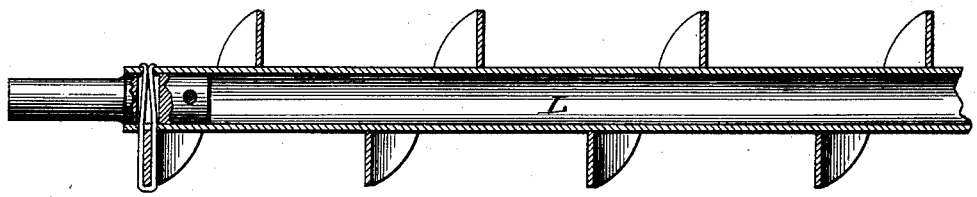
Figure 11:
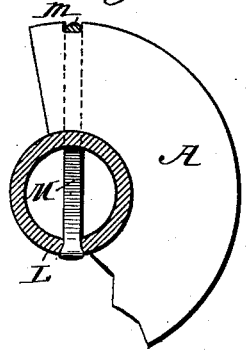
Figure 12:
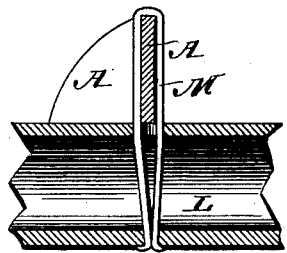

In the accompanying drawings, Figure 1 represents one end of a bar that is to form the spiral flight as punched for holding while being bent. Figs. 2 and 3 represent a longitudinal vertical section and a sectional elevation of the machine for bending the end of the bar to the shape shown by Fig. 4. Fig. 5 shows a vertical section of the mandrel and grooved guide or die as applied for spirally bending the bar. Fig. 6 is a cross-section, and Fig. 7 a plan, of the grooved guide or die; Fig. 8, a detached view of the eyebolt for connecting the punched end of the bar to the mandrel for being spirally bent. Fig. 9 is a longitudinal section of the bar after thus being spirally bent upon the mandrel; Fig. 10, the same as being stretched over its shaft and secured thereto; and Figs. 11 and 12 represent a sectional end view and a longitudinal section of the conveyer, showing manner of fastening the flight to the shaft.

Corresponding letters in the several figures of the drawings designate like parts.

A denotes the bar, of desired thickness and width, for forming the conveyer-flight, which bar has a hole, *a*, punched in its end for fastening in the several machines while bending it.

The machine shown by Figs. 2 and 3 consists of a cylindrical head, B, having a central annular groove, *b*, and having cut away at one side a segmental portion. This head is bored and rigidly mounted upon the end of a shaft, C, having secured upon its opposite end a hand-lever, D. This shaft C is pivoted in a box, E, secured upon a bed-plate, F, upon which is also secured a block, G, gouged at one end to fit under and against head B, and having a longitudinal groove, *g*, the width and depth of which correspond with the groove *b* in head B, and with the thickness and width of bar A. The end of bar A being placed into the groove *g* of block G, it is connected with head B by a pin, *d*, passed through a hole in such head and through the hole *a* of bar A, and then by turning lever D the bar A is bent to assume the shape shown by Fig. 4, the groove in block G and in head B forming guides for holding bar A from twisting or forming wrinkles while thus being bent. After thus being bent the pin *d* is withdrawn, and the lever D is rotated in the reverse direction until the flat face of head B is parallel with the guide-block G, whereby the bent end of bar A will be released from groove b, and will be moved forward to clear head B, when, in order to remove bar A, the head B and its shaft C are shifted laterally to assume the position shown by dotted lines in Fig. 3, to entirely clear bar A, which now can be lifted out from the groove b. This bar A is next secured to a mandrel, H, by its end being inserted into the slot of an eyed head, i, of a bolt, I, by a pin, h, passed through the eyes of both the bolt I and bar A, the shank of bolt I being passed through a diametrical hole in mandrel H, and being secured therein by a nut. This mandrel may either be fixed in a turning-lathe or it may form part of a special machine, wherein it is being rotated slowly, and below this mandrel is fixed a die, J, the end of which is curved, partly surrounding the mandrel H, and which has a groove, j, corresponding with the width and shape of bar A, changing from a straight line to the curve to which the bar has previously been bent, and which is the curve necessary for the proper spiral of the flights. The width of the groove j in this die J is made to accommodate various thicknesses of bars by a steel plate, f, inserted into groove j, and adjustably secured to the proper width by set-screws c.

The die J is set on a sufficient angle relative to the axis of the mandrel for forming a spiral of sufficient pitch that the advancing flights as bent will clear such die, and the groove in the die must be set very close to prevent wrinkling of the bar during the bending operation.

A spiral, as shown by Fig. 9, thus being formed, it is stretched out upon a shaft, L, which may be a pipe or a bar of any suitable or desirable shape, and it is secured thereon by cutting a notch, m, into the outer circumferential edge of the flight, and by placing over the flight a piece of bar-iron, M, semicircularly-shaped in cross-section, doubled up, and straddling the flight, with its curved portion inserted into notch m, and with the ends folded upon each other, so as to form a round shank, passed through holes in shaft L and secured by riveting.

What I claim is—

1. The method herein described of forming a continuous conveyer-flight from a single straight bar of iron by first punching the end of the bar, then curving the punched end, then winding the bar upon a mandrel simultaneously with pulling it through a grooved die, and finally stretching it upon its shaft, all substantially as set forth.

2. The device herein described for forming continuous conveyer-flights from flat bar-iron, consisting of a mandrel provided with means for coupling the end of the bar, and of a die having a curved groove, substantially as set forth, to operate as specified.

3. The herein-described device for securing conveyer-flights upon their shaft, consisting of a stirrup or strap set over the flight and having its folded ends passed through and clinched upon the shaft.

4. The combination, with a conveyer-shaft and flights thereon, of the stirrup or part M, set over the flight and passed through and clinched upon the shaft, as set forth.

5. The combination, with a conveyer-shaft, of a flight, as A, having a notch or depression, m, for a strap or stirrup set over the flight in the notch m, and carried through and clinched upon the shaft, as set forth.

6. The combination, with the shaft and conveyer-flight formed of a single piece, as described, of a strap or straps set over said flight and secured to the shaft, substantially in the manner and for the purpose set forth.

In testimony whereof I affix my signature in presence of two witnesses.

WILLIAM W. GREEN.

Witnesses:
 WM. H. LOTZ,
 OTTO LUEBKERT.